US012384583B2

(12) United States Patent
Kok et al.

(10) Patent No.: US 12,384,583 B2
(45) Date of Patent: Aug. 12, 2025

(54) PACKAGING MATERIAL SEALING DEVICE, PACKAGING MACHINE AND METHOD FOR OPERATING A PACKAGING MATERIAL SEALING DEVICE

(71) Applicant: Syntegon Packaging Solutions B.V., Weert (NL)

(72) Inventors: Tom Kok, Weert (NL); Maurice Hennissen, Weert (NL); Patrick Lagarde, Weert (NL)

(73) Assignee: Syntegon Packaging Solutions B.V., Weert (NL)

( * ) Notice: Subject to any disclaimer, the term of this patent is extended or adjusted under 35 U.S.C. 154(b) by 0 days.

(21) Appl. No.: 18/461,677

(22) Filed: Sep. 6, 2023

(65) Prior Publication Data
US 2024/0076083 A1  Mar. 7, 2024

(30) Foreign Application Priority Data
Sep. 6, 2022  (EP) .................................... 22194168

(51) Int. Cl.
*B65B 51/30*  (2006.01)
(52) U.S. Cl.
CPC .................... *B65B 51/303* (2013.01)
(58) Field of Classification Search
None
See application file for complete search history.

(56) References Cited

U.S. PATENT DOCUMENTS

| 4,537,012 | A | 8/1985 | Groom et al. |
| 4,729,210 | A * | 3/1988 | Galliano ............. B29C 66/8223 53/551 |
| 2012/0167531 | A1* | 7/2012 | Lachenmaier .... B29C 66/83221 53/479 |
| 2014/0090337 | A1 | 4/2014 | Fioravanti et al. |
| 2014/0109513 | A1* | 4/2014 | Van Rens ........... B29C 66/8226 53/285 |
| 2015/0135649 | A1 | 5/2015 | Orsini et al. |
| 2017/0113823 | A1 | 4/2017 | Wolf et al. |
| 2018/0170599 | A1* | 6/2018 | Bierschenk ......... B29C 66/4312 |

(Continued)

FOREIGN PATENT DOCUMENTS

| CN | 214452391 | 10/2021 | |
| DE | 19545810 A1 * | 6/1997 | ............. B65B 41/16 |
| DE | 102005010203 | 9/2006 | |

(Continued)

OTHER PUBLICATIONS

Extended European Search Report for European Application No. 22194168.5 mailed on Feb. 16, 2023 (10 pages).

(Continued)

*Primary Examiner* — Tanzim Imam
(74) *Attorney, Agent, or Firm* — Michael Best & Friedrich LLP

(57) ABSTRACT

A packaging material sealing device includes a first sealing jaw and at least a second sealing jaw and at least one movement unit, which includes a first actuator and at least a second actuator for actuating the two sealing jaws along a sealing direction, and at least one control unit. In at least one operating state, the control unit controls the two actuators for setting an asymmetrical sealing force for the two sealing jaws.

22 Claims, 8 Drawing Sheets

(56) References Cited

U.S. PATENT DOCUMENTS

2019/0241297 A1    8/2019  Brenkus
2022/0081144 A1*   3/2022  Tong .................... B65H 26/02

FOREIGN PATENT DOCUMENTS

| EP | 0142052    | 5/1985  |
|----|------------|---------|
| EP | 0150689    | 8/1985  |
| EP | 1510461    | 3/2005  |
| EP | 1810922    | 7/2007  |
| EP | 2447043    | 5/2012  |
| WO | 2012152403 | 11/2012 |

OTHER PUBLICATIONS

Extended European Search Report for European Application No. 22194166.9 mailed on Sep. 2, 2023 (9 pages).
United States Patent Office Non-Final Rejection for U.S. Appl. No. 18/459,751 dated Sep. 30, 2024 (15 pages).

* cited by examiner

PACKAGING MATERIAL SEALING DEVICE, PACKAGING MACHINE AND METHOD FOR OPERATING A PACKAGING MATERIAL SEALING DEVICE

CROSS REFERENCE TO RELATED APPLICATION

This application claims priority to European patent application EP22194168.5, filed on Sep. 6, 2022.

BACKGROUND

From the prior art, for example from the document CN 214452391 U, a sealing device for sealing a packaging material comprising at least two sealing jaws and a movement unit for moving the two sealing jaws is already known. The movement unit is intended for setting a symmetrical sealing force for the sealing jaws. A disadvantage of such a mechanism is that it requires a manual mechanical adjustment to change the seal force distribution. When different packaging material sizes or styles are to be sealed, different sealing forces are sometimes required in different sections of the packaging material, in particular if the packaging material has, for example, in a first region at least two layers and in at least a second section at least four layers.

Moreover, EP 0 142 052 A2, DE 10 2005 010 203 A1 and EP 2 447 043 A2 also disclose sealing devices for sealing a packaging material.

SUMMARY

The invention is based on a packaging material sealing device, in particular a cross seam packaging material sealing device for a vertical packaging machine, comprising: a first sealing jaw and at least a second sealing jaw; at least one movement unit, which comprises a first actuator and at least a second actuator for actuating the two sealing jaws along a sealing direction; and at least one control unit.

It is proposed that in at least one operating state the control unit controls the two actuators for setting an asymmetrical sealing force for the two sealing jaws.

By means of the invention an efficiency with respect to a sealing process can be improved and/or a higher quality can be achieved. Preferably, a packaging material can be homogeneously sealed, even if the packaging material has different numbers of layers in different sections of the packaging material. Sections of the packaging material having a higher number of layers of the packaging material may require a higher sealing force than sections of the packaging material having a lower number of layers of the packaging material, as compared to at least the said other section. This can provide a strong and/or suitable sealing seam for the packaging material. In addition, the seal force can be set more homogeneously when mechanical imperfections are present. Further, it is possible to provide a compact packaging material sealing device. Preferably, springs for actuating the two sealing jaws and for setting a sealing force for the two sealing jaws can be dispensed with. Due to at least two actuators and a control unit for controlling the two actuators it can dispense with manual mechanical adjustments of the two sealing jaws. Thereby, a higher user and/or producer comfort can be achieved. Furthermore, a handling can be simplified and the sealing process can be faster and more efficient.

In particular, the packaging material sealing device is part of a packaging machine. The packaging material sealing device can be a subassembly of the packaging machine or can be embodied as the whole packaging machine. Preferably, the packaging machine is a vertical packaging machine. The packaging machine can be part of a vertical form fill and seal system (VFFS-System). The packaging machine can, without being limited to this, be intended at least for packaging and/or repackaging of products. Preferably, the packaging machine is intended for sealing packaging material. Furthermore, the packaging machine can be intended at least for forming and/or closing packaging material and/or for filling, transporting, sorting and/or conveying of products The packaging machine may comprise a plurality of further devices and/or units and/or systems for handling and/or processing and/or dosing and/or storing and/or packaging and/or transporting and/or handling and/or sorting of products, which the person skilled in the art considers as useful, for example such as at least one cutting device, at least one dosing device, at least one filling device, at least one storage device, at least one sterilization device, at least one product handling device, for example transporting products, and/or other devices.

The packaging material sealing device can be embodied as a longitudinal packaging material sealing device. Particularly preferably, the packaging material sealing device is embodied as a transverse sealing device, in particular the cross seam packaging material sealing device. If the packaging material sealing device is embodied as the cross seam packaging material sealing device the packaging machine can additionally comprise a longitudinal packaging material sealing device for sealing the packaging material longitudinally. The packaging material sealing device is, without being limited to this, at least intended for sealing packaging material, preferably a packaging material tube. In particular, the packaging material tube is formed after a forming and/or deforming of packaging material. Further, the packaging forming device may be provided at least for a packing and/or a filling of products. Within the packaging material tube, namely in a product receiving area, at least one product or a plurality of products can be placed and/or placeable. Advantageously, the packaging sealing device has a packaging material receiving area in which the packaging material, in particular the packaging material tube and at least the product can be received and/or are received. In particular, the product receiving area is part of the packaging material receiving area. Preferably, the packaging material tube is placed and/or placeable in the packaging material receiving area. Preferably, the packaging material in the packaging material receiving area at least partially delimits and/or defines the product receiving area.

By means of the packaging material, the product can be at least partially and advantageously completely packaged. In particular, the packaging material, preferably the packaging material tube, is intended for packaging, namely for at least partial wrapping and/or encasing and/or covering the product. The product can be, for example, a solid, liquid, paste-like and/or chunky product. Furthermore, the product can be, for example, a food, a pharmaceutical product, a commodity, a beauty and/or personal care product, such as chocolate bars, potato chips, sauces, spreads, pastes, ready meals, confectionery, creams, and/or shampoos or the like. It is also conceivable that the product is a consumer product and/or an article from the field of toys, handicrafts, kitchen and/or household or something else, such as a toy car, a ladle, a pot, a small electrical appliance, for example a mixer and/or a kitchen scale, and/or a screw. The product can be any conceivable product, which the person skilled in the art considers as useful.

The packaging material can be guided on at least a packaging material web and/or a packaging material roll, which has a flat, planar and/or elongated and/or rectangular configuration and/or design. The packaging material can be made at least partially, advantageously, at least to a great part or completely, of a mineral, a metal, a plastic and/or a composite material. The packaging material could be made at least partially, in particular at least to a great part or completely, from renewable raw materials, for example wood, wool, algae and/or straw. By the phrasing "to a great part" should be understood in this context to mean, for example, at least 55%, advantageously at least 65%, preferably at least 75%, particularly preferably at least 85% and especially advantageously at most 95% of a volume and/or area and/or mass component of an object.

The packaging machine can comprise a machine frame, according to which the packaging material sealing device is arranged. The packaging machine comprises preferably at least one packaging material supply station having at least one component configured for transporting and/or guiding the packaging material and/or for holding the packaging material web and/or the packaging material roll. Further the packaging machine can comprise a product supply station having at least one component configured for holding and/or transporting and/or guiding the products. In particular, the packaging machine comprises a forming unit for transforming and/or forming the packaging material into the packaging material tube. The forming unit can comprise at least one forming edge, which is intended for folding and/or deforming the packaging material. Preferably, the folding unit comprises at least one form shoulder or the like for transforming and/or forming the packaging material into the packaging material tube.

In particular, the packaging machine comprises at least one filling station for a filling of the packaging material, in particular the packaging material tube, with the product. The filling station, the product supply station, the packaging material supply station, the packaging material sealing device and/or the longitudinal packaging material sealing device are/is in particular attached to the machine frame of the packaging machine. The first actuator and/or the second actuator of the packaging material sealing device are/is preferably arranged relative to the machine frame in an at least substantially positionally fixed manner. The actuator, in particular the first actuator and/or at least the second actuator, can comprise for example a stepper motor, a pneumatic motor or a hydraulic motor. Advantageously, the actuator, in particular the first actuator and/or the second actuator, is embodied as a servo actuator comprising a servo motor.

The movement unit is preferably configured to convert a power, which is generatable by the two actuators and acts onto the two sealing jaws, into a, advantageously horizontal and/or vertical, movement of the two sealing jaws relative to each other, in particular relative to the frame of the packaging machine. By actuating the two actuators, the two sealing jaws are movable along the sealing direction, in particular towards each other. In addition, by actuating the two actuators, the two sealing jaws can be moved apart from each other against the sealing direction, in particular after the sealing process. In at least one operating state the two actuators can be intended for moving the two sealing jaws substantially horizontal along a horizontal axis relative to each other. Preferably the at least two sealing jaws are configured to seal the packaging material, which is arrangeable between the at least two sealing jaws. Advantageously, an area between the two sealing jaws is the said packaging material receiving area. In a sealing position, the packaging material is preferably arranged in the packaging material receiving area between the two sealing jaws. In particular, each of the two sealing jaws has a sealing surface. The sealing surfaces of the two sealing jaws can be positioned facing each other. In at least one operating state, which can be the said operating state, the sealing surfaces of the two sealing jaws are preferably in contact with the packaging material during a sealing process in order to create a sealing seam in the packaging material. The sealing surfaces of the two sealing jaws preferably run at least substantially perpendicular to the sealing direction, in particular a substantially horizontal sealing direction. Preferably, the sealing seam is orientated substantially perpendicular to the sealing direction. The term "substantially perpendicular" is here to mean an orientation of a direction relative to a reference direction, wherein the direction and the reference direction, in particular viewed in a projection plane, include a 90° angle and the angle has a maximum deviation of in particular less than 8°, advantageously less than 5° and especially advantageously less than 2°.

In at least the said operating state, the control unit controls the two actuators for moving the two sealing jaws and setting the sealing force for the two sealing jaws. A "control unit" is to be understood as an electronic unit which is preferably at least partially integrated in a control and/or regulating unit of the packaging machine and which is preferably provided to control and/or regulate at least the two actuators. Advantageously, the control unit comprises a computing unit, in particular a processor, and preferably, in addition to the computing unit, a memory unit with a control and/or regulating program stored therein, which is intended to be executed by the computing unit. The memory unit can be designed as a digital storage medium, for example as a hard disk or the like. The control unit can be controllable by means of, for example, a remote controller and/or another similar device. Advantageously, the packaging material sealing device comprises a user interface that allows a user to make some settings and/or configurations. In particular, the control unit is connected with the user interface. Particularly preferably, the memory unit stores a setting of at least the two actuators for setting the sealing force to the sealing jaws and/or a setting of an orientation of the two sealing jaws, in particular depending on a configuration, for example a shape, a structure, in particular material structure, a thickness, a number of layers, a material, a material combination and/or a form, of the packaging material to be sealed. Before starting the sealing process the control unit can control a calibration, in particular an autocalibration, of the two sealing jaws. Depending on the stored settings the control unit can control the calibration, in particular the autocalibration.

The control unit can simultaneously control at least both actuators. For setting the asymmetrical force for the two sealing jaws, the control unit preferably controls the two actuators with different torques. In particular, when the torque of the two actuators, in particular of the two servo motors, is different during at least the sealing process, the resulting sealing force will be asymmetric.

In this context, "configured" and/or "intended" is to mean specifically programmed, designed and/or equipped. By an object being configured and/or intended for a certain function, it is to be understood that the object fulfills and/or implements this certain function in at least one application state and/or operating state. Moreover, it should be noted, that in the present document, number words, such as "first/r/s", "second/r/s" and "further", which precede certain terms, serve merely to distinguish objects and/or an assignment between objects and do not imply an existing total number and/or ranking of the objects and/or the process steps. In particular, a "second" or "further" object and/or process step does not necessarily imply the existence of a "first" object and/or process step.

In another aspect of the invention, which can in particular be considered in combination with as well as separately from other aspects of the invention, it is proposed that the movement unit comprises a first drive shaft, which is connected to the first actuator and allows movement of first sections of the two sealing jaws, and at least a second drive shaft, which is connected to the second actuator and allows movement of second sections of the two sealing jaws. In that way, a homogeneously sealed packaging material with different numbers of layers in different sections of the packaging material can be provided. Furthermore, a sealing process can be improved.

The term "section" can also be understood as "area" in this present case. In particular, each of the two sealing jaws has one of the first sections and at least one of the second sections. The first section and/or the second section of the first sealing jaw can extend at least 10%, preferably at least 30% and particularly preferably at least 50% of a main extension of the first sealing jaw, in particular starting from an outer edge at a narrow side of the first sealing jaw. Further, the first section and/or the second section of the second sealing jaw can extend at least 10%, preferably at least 30% and particularly preferably at least 50% of a main extension of the second sealing jaw, in particular starting from an outer edge at a narrow side of the second sealing jaw. The first sections can refer to left sides of the two sealing jaws and the second sections can refer to right sides of the said two sealing jaws or the other way around. Preferably the first sealing jaw is made in a one-piece embodiment. Particularly preferably, the second sealing jaw is made in a one-piece embodiment.

During the sealing process, the two actuators can have different torques thereby the two drive shafts can be turned/rotated in different ways, in particular with different velocities and/or by different distances and/or turns, preferably thereby it can be set an asymmetrical sealing force to the two sealing jaws. Depending on a setting of the control unit, for example the first actuator can set a stronger sealing force for the first sections compared to the second sections. Alternatively, the second actuator can set a stronger sealing force for the second sections compared to the first sections.

Due to the two drive shafts the torque of the two actuators can be transferred to the two sealing jaws. The first drive shaft can be connected with the first actuator, in particular with the first servo motor of the first actuator, for example via at least one gearbox. The second drive shaft can also be connected with the second actuator, in particular with the second servo motor of the second actuator, for example via at least one gearbox.

Further it is proposed that the first drive shaft and the second drive shaft are each mounted perpendicularly to the sealing direction, preferably substantially parallel to a vertical axis. In that way, a compact packaging material sealing device can be provided. Furthermore, a handling can be simplified and the sealing process can be faster and more efficient.

In particular, an angle between a main extension axis of the first drive shaft and the sealing direction and/or an angle between a main extension axis of the second drive shaft and the sealing direction has a maximum deviation from a 90° angle of in particular less than 8°, advantageously less than 5° and especially advantageously less than 2°. By a "main extension axis" of an object is herein an axis to be understood which extends parallel to a longest edge of a smallest geometric rectangular cuboid that just still completely encloses the object. Particularly preferably, the first drive shaft and the second drive shaft are mounted substantially parallel to each other. In particular, the two drive shafts are mounted substantially parallel to a vertical axis. The term "substantially parallel" is here to mean an orientation of a direction relative to a reference direction, in particular in a plane, wherein the direction relative to the reference direction has a deviation smaller than 8°, advantageously smaller than 5° and especially advantageously smaller than 2°.

For the purpose of increasing an efficiency of a sealing process and of improving of a transferring a torque of at least one actuator to at least one sealing jaw, it is proposed that the movement unit comprises a first articulated joint for transferring a torque of the first drive shaft to the first sections of the two sealing jaws and comprises a second articulated joint for transferring a torque of the second drive shaft to the second sections of the two sealing jaws.

By turning the two drive shafts the two articulated joints can be moved for moving the sealing jaws along the sealing direction, in particular towards each other and/or against each other. The first articulated joint can comprise at least two hinging arms, wherein a first hinging arm of the two hinging arms can be connected with the first section of the first sealing jaw. A second hinging arm of the two hinging arms can be connected with the first section of the second sealing jaw. Due to the turn/rotation of the first drive shaft the two hinging arms can be movable to move the first sections of the two sealing jaws along the sealing direction. Further, the second articulated joint can comprise at least two further hinging arms, wherein a further first hinging arm of the two further hinging arms can be connected with the second section of the first sealing jaw. A further second hinging arm of the two further hinging arms can be connected with the second section of the second sealing jaw. Due to the turn/rotation of the second drive shaft the two further hinging arms can be movable to move the second sections of the two sealing jaws along the sealing direction. Advantageously, the torque of the two actuators, in particular the two servo motors, is converted to the sealing force using two double crank-slider mechanisms. In particular, the two articulated joints are each embodied as a crank-slider unit.

It is conceivable that in at least one operating state the movement unit compresses the two sealing jaws by pushing the two sealing jaws toward each other. Particularly preferably, in at least one operating state the movement unit compresses the two sealing jaws by pulling the two sealing jaws toward each other. In that way, a sealing force can be transferred more efficiently. In addition, a sealing mechanism can be simplified for the movement of at least two sealing jaws. Furthermore, a homogeneously sealed packaging material can be provided and thereby a higher comfort can be achieved.

During the sealing process the two sealing jaws can be compressed towards each other by rotating/turning the two drive shafts, in particular thereby the hinging arms and/or the further hinging arms can be moved for pulling the two sealing jaws along the sealing direction. By turning the two drive shafts in an opposite direction, the two sealing s jaws can again be pulled away from each other along the sealing direction. Preferably, during the sealing process, a package to be sealed, which is formed from the packaging material, is separated, in particular cut off, from the packaging material tube. In particular, after the sealing process the two sealing jaws are again pulled apart from each other against the sealing direction, preferably for releasing the sealed packaging material, in particular the sealed package. After the sealing process the control unit can actuate the two actuators to move the two sealing jaws away from each other against the sealing direction. By turning the two drive shafts in the other direction the two articulated joints can be pulled apart from each other against the sealing direction.

In another aspect of the invention, which can in particular be considered in combination with as well as separately from other aspects of the invention, it is proposed that the movement unit comprises a further first actuator and at least a further second actuator for moving the two sealing jaws perpendicular to the sealing direction, in particular along a vertical axis. In that way, an efficiency with respect to a sealing process can be further increased, wherein a movement of at least two sealing jaws perpendicular to a sealing direction can be provided. Due to at least two further actuators and a control unit for controlling the two further actuators it can dispense with manual mechanical adjustments. Thereby, a higher user and/or producer comfort can be achieved. Furthermore, a handling can be simplified and the sealing process can be faster.

Particularly preferably, the two actuators are intended to move the two sealing jaws along or against the sealing direction, which is substantially parallel to the horizontal axis, wherein the two further actuators are intended to move the two sealing jaws along the vertical axis, which is substantially perpendicular to the sealing direction. The two further actuators can be embodied in a different way as the two actuators described above. Preferably, the two further actuators, in particular motors of the two further actuators, are identically embodied as the two actuators, in particular motors of the two actuators. The phrasing "identical objects" is to mean, in this context, objects which advantageously have the same structure and/or shape and/or outer contour and/or design and/or at least to a great part and preferably completely the same material combination, but may at least partially differ in particular as regards their functionality, their inner structure, and/or their arrangement on another object. However, preferably the at least substantially identical objects are identical aside from manufacturing tolerances and/or within the range of standardized tolerances.

For the purpose of improving a movement of at least two sealing jaws perpendicular to a sealing direction, it is proposed, that the movement unit comprises a first threaded rod connected to the further first actuator and comprises at least a second threaded rod connected to the further second actuator, wherein the two sealing jaws are movable perpendicular to the sealing direction, in particular along a vertical axis, along the two threaded rods.

The first threaded rod and the second threaded rod can be each mounted perpendicularly to the sealing direction. In particular, an angle between a main extension axis of the first threaded rod and the sealing direction and/or an angle between a main extension axis of the second threaded rod and the sealing direction has a maximum deviation from a 90° angle of in particular less than 8°, advantageously less than 5° and especially advantageously less than 2°. Particularly preferably, the first threaded rod and the second threaded rod are arranged substantially parallel to each other. The first threaded rod can be connected with the further first actuator, in particular with at least one further first servo motor of the further first actuator, for example via at least one gearbox. The second threaded rod can also be connected with the further second actuator, in particular with at least one further second servo motor of the further second actuator, for example via at least one gearbox.

For the purpose of providing a compact and/or efficient design of a packaging material sealing device, it is proposed that the two threaded rods are mounted parallelly to the two drive shafts. The first threaded rod can be mounted substantially parallel to the first drive shaft. The second threaded rod can be mounted substantially parallel to the second drive shaft. In particular, the two threaded rods are mounted substantially parallel to the vertical axis. Particularly preferably, the two threaded rods are mounted substantially parallel to each other. It is also conceivable, that the first threaded rod and the first drive shaft, in particular the second threaded rod and the second drive shaft, are made in a one-piece embodiment, preferably are constructed in a combined pair of shafts. Meaning, the first threated rod or the second threaded rod can also comprise a spline as the first drive shaft or the second drive shaft. In this way, a very compact design of a packaging material sealing device can be realized.

Further, it is proposed that in at least one operating state the control unit actuates the two further actuators whereby the two sealing jaws are movable along the two drive shafts. In that way, a very precise and efficient control of a movement of at least two sealing jaws perpendicular to a sealing direction can be provided. Thereby a sealing process as well as a construction and/or design of a packaging material sealing can be improved in an efficient way.

Preferably, at least during the sealing process, namely while the two sealing jaws seal the packaging material the control unit actuates the two further actuators, whereby the two sealing jaws are movable along at least the two drive shafts. Particularly preferably, by actuating the two further actuators the sealing jaws are movable along the two drive shafts and simultaneously along the two threaded rods. Alternatively and/or additionally, the control unit can actuate the two further actuators after the sealing process.

During the sealing process, namely during sealing of the packaging material the two sealing jaws can be moved along the vertical axis from a first rest position to a second rest position. At a beginning of the sealing process the two sealing jaws can be positioned in the first rest position close to the two actuators and/or the two further actuators. In the first rest position the two sealing jaws are arranged in particular close to the filling station, preferably the filling tube, for taking and/or receiving the packaging material. Along a transport direction of the packing material the two sealing jaws can receive the packaging material. Preferably, the transport direction of the packaging material is substantially parallel to the vertical axis. In the first rest position the control unit can actuate at least the two actuators for moving the two sealing jaws towards each other along the sealing direction, in particular for compressing the packaging material between the two sealing jaws. During the sealing process, namely during sealing of the packaging material the two sealing jaws can be moved along the vertical axis from the first rest position to the second rest position, thereby transporting and/or moving the packaging material along the transport direction. It can be possible that during the sealing process, namely during sealing of the packaging material the two sealing jaws are moved along the vertical axis from the first rest position to the second rest position, the two sealing jaws are pulling the packaging material along the transport direction. In the second rest position the control unit can actuate at least the two actuators to move the two sealing jaws away from each other against the sealing direction, in particular for releasing the sealed packaging material, preferably the sealed package.

Particularly preferably, the memory unit of the control unit stores a setting of at least the two further actuators for moving the sealing jaws, in particular depending on a configuration, for example a shape, a structure, in particular material structure, a thickness, a number of layers, a material, a material combination and/or a form, of the packaging material to be sealed and/or depending on a speed and/or performance of the sealing process.

For the purpose of improving a configuration/construction of a packaging material sealing device and/or of improving a connection of at least two sealing jaws to at least two actuators and/or at least two further actuators and/or of improving a transmission of a torque of at least two actuators to the sealing jaws, it is proposed that the movement unit comprises at least one first movement element, which has a first threaded portion cooperating with the first threaded rod and which is supported on the first drive shaft, and comprises at least one second movement element, which has a second threaded portion cooperating with the second threaded rod and which is supported on the second drive shaft.

Furthermore, it is proposed that the first movement element supports the first articulated joint and the second movement element supports the second articulated joint. In that way a connection between at least two sealing jaws and a at least two actuators and/or at least two further actuators can be further improved.

Preferably, the two movement elements are intended for connecting the two sealing jaws, in particular the two articulated joints, with the two drive shafts and the two threaded rods. The two drive shafts, namely the first drive shaft and at least the second drive shaft can be embodied as spline shafts. The two drive shafts each comprise guiding rails, in which the movement elements are moveable substantially perpendicular to the sealing direction.

In particular, the first movement element is connected with the first articulated joint and the second movement element is connected with the first articulated joint. It can be conceivable that the first movement element is made in a one-piece embodiment with the first articulated joint and/or the second movement element is made in a one-piece embodiment with the second articulated joint. By "made in a one-piece embodiment" is to mean, connected at least by substance-to-substance bond, for example by a welding process, a gluing process, an injection-molding process, and/or another process that is deemed expedient by someone skilled in the art and/or advantageously formed in one piece, like for example by a production from a cast and/or by a production in a one-component or multi-component injection-molding procedure, and advantageously from a single blank.

Alternatively, it is also conceivable that the first articulated joint is mounted in a detachable, in particular a non-destructive, manner on the first movement element. Further, it is also conceivable that the second articulated joint is mounted in a detachable, in particular a non-destructive, manner on the second movement element. Preferably, the first articulated joint is movably, particularly preferably rotatably, mounted in the first movement element and/or the second articulated joint is movably, particularly preferably rotatably, mounted in the second movement element.

In particular, in at least one operating state, which can be the said operating state, the sealing surfaces of the two sealing jaws run at least substantially parallel to each other. The term "substantially parallel" is here to mean an orientation of a direction relative to a reference direction, in particular in a plane, wherein the direction has a deviation from the reference direction that is smaller than 8°, advantageously smaller than 5° and especially advantageously smaller than 2°.

In another aspect of the invention, which can in particular be considered in combination with as well as separately from other aspects of the invention, it is proposed that in at least one operating state the control unit controls a rotation of the two sealing jaws relative, in particular perpendicular, to a transport direction of a packaging material. By such a design/construction of a packaging material sealing device, packaging materials with different size and shape, for example which differs from tabular shapes, can be sealed. Further, the packaging material can be homogeneously sealed and sealed packages having at least substantially 90° angles at their corner can be provided. This can provide a strong and/or suitable sealing seam for the packaging material.

In particular, the transport direction and the packaging material are the same transport direction and the same packaging material as described above. In the first rest position of the sealing jaws, in particular before the beginning of sealing the packaging material, the control unit can control the rotation of the two sealing jaws relative, in particular perpendicular, to the transport direction of the packaging material. Alternatively and/or additionally, the control unit can control the rotation of the two sealing jaws relative, in particular perpendicular, to the transport direction of the packaging material during the sealing process and/or after the sealing process, when the two sealing jaws are in the second rest position. Particularly preferably, the control unit controls the rotation depending on the configuration, for example the shape, the structure, the size and/or the form, of the packaging material to be sealed.

Further, it is proposed that in the operating state the control unit controls the rotation of the two sealing jaws by actuating the further first actuator independently from the further second actuator. In that way, a sealing of a packaging material can be improved and preferably a strong and/or suitable sealing seam for the packaging material can be provided. Furthermore, a handling can be simplified and the sealing process can be faster and more efficient.

For example, the control unit can control the rotation by only actuating the further first actuator, in particular without actuating the further second actuator. Thereby the first sections of the sealing jaws can be rotated relatively, in particular perpendicularly, to the transport direction of the packaging material, in particular moved along the first threaded rod. It can be also conceivable that the control unit only actuates the further second actuator, in particular without actuating the further first actuator. Thereby the second sections of the sealing jaws can be rotated relatively, in particular perpendicularly, to the transport direction of the packaging material, in particular moved along the second threaded rod. Alternatively, the control unit can control the rotation by actuating the two further actuators in opposite directions so that, for example, the first sections of the sealing jaws move upwardly along the transport direction of the packaging material, in particular along the first threaded rod and the second sections of the sealing jaws move downwardly along the transport direction of the packaging material, in particular along the second threaded rod.

A rotation angle between a rotated position of the two sealing jaws and a rest and/or starting position of the two sealing jaws, in particular in which the two sealing jaws are orientated parallel to the horizontal axis, can be at least 0.5°, advantageously at least 2° and preferably at least 5°. Further the rotation angle can be maximally 20°, preferably maximally 15° and particularly preferably maximally 10°.

For improving a design and/or construction of a packaging material sealing device, it is proposed that at least two guiding rails of the movement unit for moving the two sealing jaws along and/or against the sealing direction each have clearance with respect to their bearings in order to allow the rotation of the two sealing jaws relative to the transport direction. The movement unit comprises a first guiding rail and at least a second guiding rail. The control unit can control the two actuators for moving the two sealing jaws along the two guiding rails. In particular, the bearings are part of the movement unit. Preferably, each guiding rail is mounted into at least two bearings. The movement unit can comprise a first bearing and at least a further first bearing of the bearings. The first bearing and the further first bearing can each receive the first guiding rail. Further, the movement unit can comprise a second bearing and at least a further second bearing of the bearings. The second bearing and the further second bearing can each receive the second guiding rail.

Advantageously, the two movement elements are connected with the two guiding rails, wherein the first movement element can be connected with the first guiding rail and the second movement element can be connected with the second guiding rail. The two movement elements can receive the two guiding rails. In particular, the first hinging arm is connected with the first bearing and the second hinging arm is connected with the further first bearing. Further, the further first hinging arm can be connected with the second bearing and the further second hinging arm can be connected with the further second bearing.

In another aspect of the invention, which can in particular be considered in combination with as well as separately from other aspects of the invention, it is proposed that the packaging material sealing device comprise a sensor unit for detecting a parameter of the packaging material. In that way, an efficiency with respect to a sealing process can be improved and/or a higher comfort can be achieved. By detecting a parameter of the packaging material, manual monitoring by a user and/or producer can be dispensed with. The sensor unit can communicate, in particular via wires and/or wirelessly, with the control unit. Preferably, the sensor unit is connected with the control unit.

Further, it is proposed, that the control unit is intended to store at least one setting for at least one actuator, preferably for the two actuators and/or the two further actuators, in a recipe belonging to a certain sealing process. In that way, sealing processes can be improved and/or a higher quality can be achieved. Moreover, different setting values for a packaging material sealing device can be stored and used for every possible product that is to be produced, namely at least sealed. Preferably, the recipe comprises stored settings to a production, namely at least one sealing process of a certain product. In particular, the control unit is intended to store a control setting of the two actuators and/or the two further actuators depending on the parameter of the packaging material. The parameter of the packaging material can be, for example, a number of layers, a thickness parameter, a weight parameter, a size parameter and/or an orientation parameter of the packaging material.

Moreover, it is proposed that the sensor unit comprises at least one sensor for detecting a number of layers of the packaging material to be sealed. This enables a precise and efficient setting and/or adjustment of a sealing force for at least two sealing jaws. Preferably, the sealing force can be automatically set depending on a number of layers of a packaging material to be sealed. Thereby, a higher user and/or producer comfort can be achieved.

The sensor can be, for example, an IR-sensor, a weight sensor and/or an ultrasonic sensor or the like. The sensor for detecting the number of layers of the packaging material can be mounted, for example, on a carrier element of the packaging material sealing device and/or on the movement unit, in particular on at least one of the movement elements and/or at the sealing jaws. Depending on the detection of the number of layers the control unit can automatically control the setting of the sealing force for the two sealing jaws, in particular if the sealing force is symmetrical or asymmetrical and if the sealing force is asymmetrical, in which of the sections, in particular the first sections or the second sections, of the two sealing jaws a stronger sealing force is to be provided.

Further, it is proposed that the sensor unit comprises at least one sensor for detecting a shape of the packaging material. This enables a precise and efficient setting and/or adjustment of a sealing force for at least two sealing jaws. Preferably, the two sealing jaws can automatically be orientated depending on a shape of a packaging material to be sealed. Thereby, a higher user and/or producer comfort can be achieved.

The sensor for detecting the shape can be the same sensor as the sensor for detecting the number of layers. It can be conceivable that the sensor for detecting the shape is made in a one-piece embodiment with the sensor for detecting the number of layers. Alternatively, the two sensors can be different. The sensor for detecting for detecting the shape of the packaging material can be mounted, for example, on the carrier element and/or on the movement unit, in particular on at least one of the movement elements and/or at the sealing jaws. Depending on the detection of the shape of the packaging material the control unit can automatically control the rotation, namely the rotation angle.

Furthermore, the invention is based on a method for operating a packaging material sealing device, in particular the said packaging material sealing device. In that way an efficiency with respect to a sealing process can be improved.

The packaging material sealing device according to the invention, the packaging machine according to the invention and/or the method for operating a packaging material sealing device according to the invention shall herein not be limited to the application and implementation described above. In particular, in order to fulfill a functionality that is described here, the packaging material sealing device according to the invention, the packaging machine according to the invention and/or the method for operating a packaging material sealing device according to the invention may comprise a number of individual elements, components and units as well as method steps that differ from a number given here. Moreover, concerning the value ranges given in the present disclosure, values within the limits mentioned shall also be considered to be disclosed and to be usable as applicable.

BRIEF DESCRIPTION OF THE DRAWINGS

Further advantages will become apparent from the following description of the drawing. In the drawing an exemplary embodiment of the invention is illustrated. The drawing, the description and the claims contain a plurality of features in combination. Someone skilled in the art will purposefully also consider the features individually and will find further expedient combinations.

It is shown in.

DETAILED DESCRIPTION

If there is more than one specimen of a certain object, only one of these is given a reference sign in the figures and in the description. The description of this specimen may be correspondingly transferred to the other specimens of the object. Furthermore, the figures are schematic and not true-to-scale.

Figure 1:
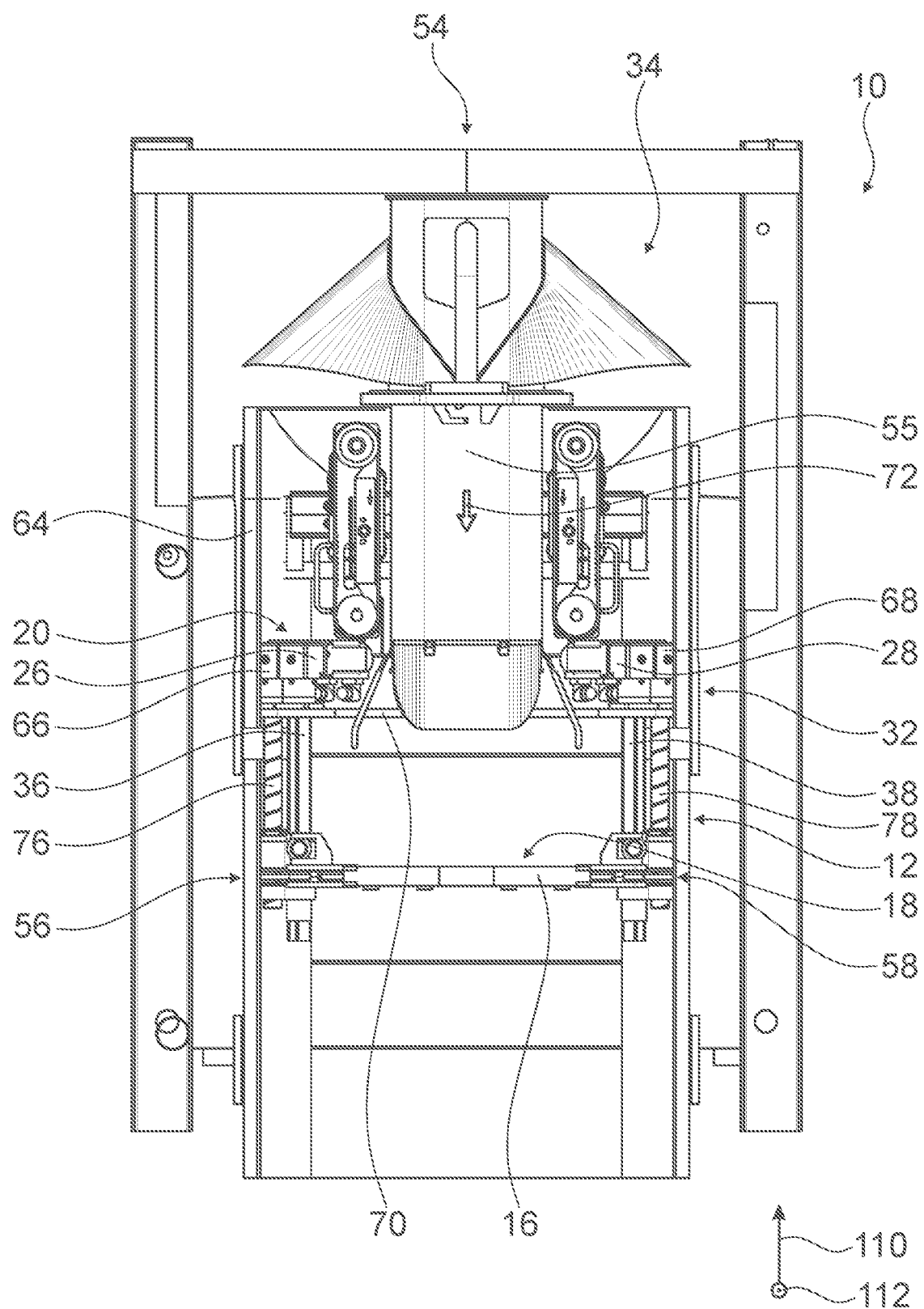
FIG. 1 a section of a packaging machine which is embodied as a vertical packaging machine comprising a packaging material sealing device in a schematic representation, FIG. 2 a further view of the packaging machine according to FIG. 1, FIG. 3 a detailed schematic representation the packaging material sealing device according to the invention, FIG. 4 a detailed view of a first drive shaft and a first threaded rod of a movement unit of the packaging material sealing device, which are connected to a first movement element of the movement unit, FIG. 5 a detailed view of at least two sealing jaws of the packaging material sealing device and the movement unit, which is intended for actuating the two sealing jaws, FIG. 6 a further detailed schematic representation of the packaging material sealing device, which is positioned in a second rest position, FIG. 7 a schematic flow chart of a method for operating the packaging material sealing device according to the invention, FIG. 8 a sealed package made of a packaging material having at least two sealing seams, FIG. 9 a cross section of the packaging material which is to be sealed and FIG. 10 a top view of another package which has at least two slanted sealing seams, which differ from horizontal sealing seams.
Figure 2:
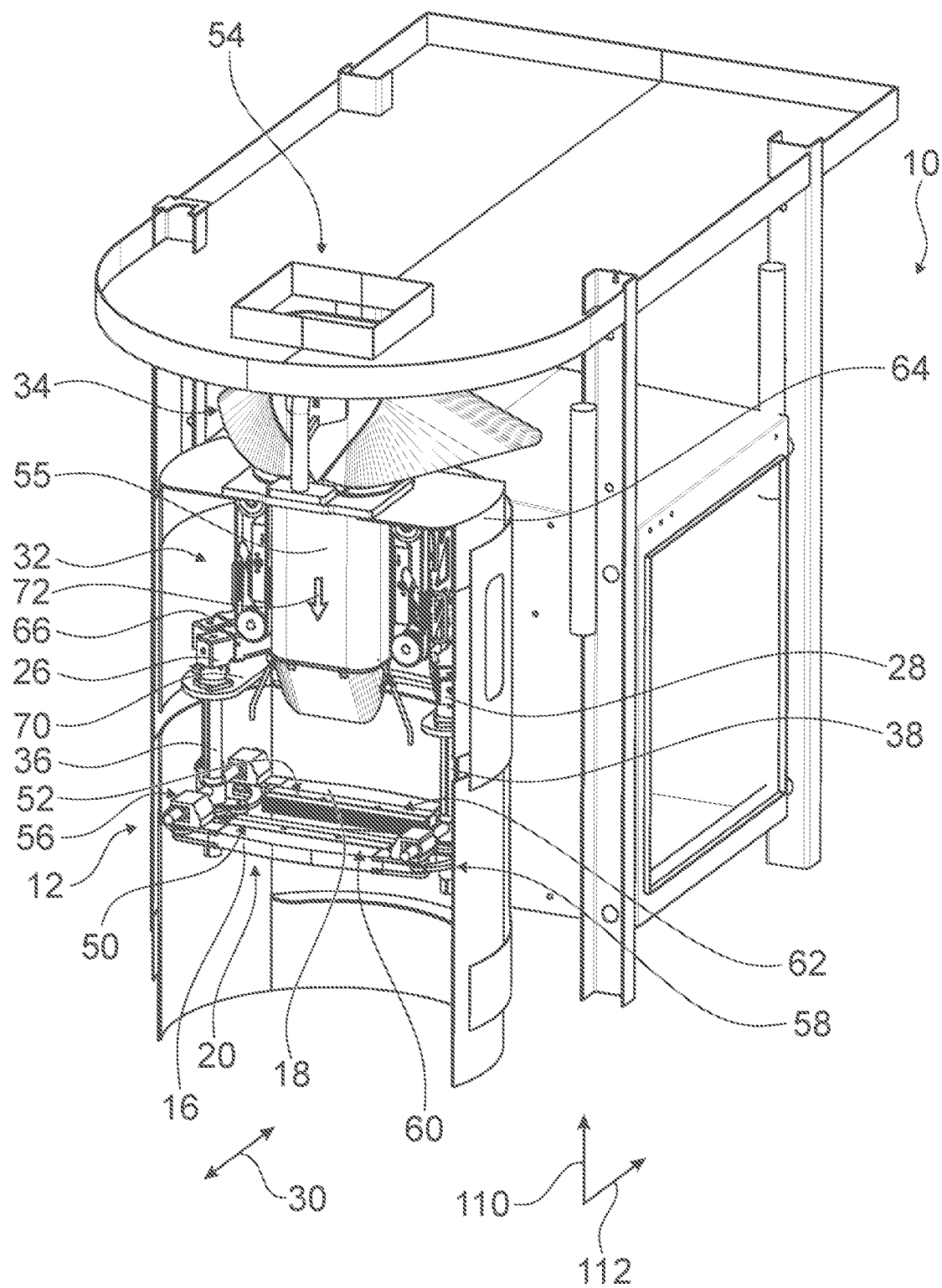

In FIGS. 1 and 2 at least a section of a packaging machine 10 is shown. In this embodiment the packaging machine 10 is a vertical packaging machine. The packaging machine 10 is part of a vertical form fill and seal system (VFFS-System). The packaging machine 10 is, without being limited to this, intended at least for packaging and/or repackaging of products. Further, the packaging machine 10 can be intended at least for forming and/or for closing packaging material 14, 14' and/or for filling and/or for transporting and/or for sorting and/or for conveying of products. The packaging machine 10 can comprise a plurality of devices and/or units and/or systems for handling and/or processing and/or dosing and/or storing and/or packaging and/or transporting and/or handling and/or sorting of products.

The packaging machine 10 comprises at least one packaging material supply station (not shown here) having at least one component configured for transporting and/or guiding the packaging material 14, 14' and/or for holding a packaging material web and/or a packaging material roll (not shown here). Further, the packaging machine 10 comprises a forming unit 34 having at least one form shoulder for forming and/or transforming the packaging material 14, 14' into a tube. The packaging machine 10 comprises a product supply station (not shown here) having at least one component configured for holding and/or transporting and/or guiding products. For filling the packaging material 14, 14', namely the packaging material tube with the product, the packaging machine 10 comprises at least one filling station 54. The filling station 54 comprises at least one filling tube 55 that is configured to fill the packaging material 14, 14' with content.

In this embodiment the packaging machine 10 is intended at least for sealing packaging material 14, 14'. The packaging machine 10 comprises a packaging material sealing device 12. The packaging material sealing device 12 can be a longitudinal sealing device for a longitudinal sealing of the packaging material 14, 14'. In this case, the packaging material sealing device 12 is a transverse sealing device, namely a cross seam packaging material sealing device for a transverse sealing of the packaging material 14, 14'. Additional to the packaging material sealing device 12 the packaging machine 10 comprises in this case a longitudinal packaging material sealing device (not shown here) for a longitudinal sealing of the packaging material 14, 14'.

The filling station 54, the product supply station, the packaging material supply station, the packaging material sealing device 12 and/or the longitudinal packaging material sealing device are/is attached to a machine frame 64 of the packaging machine 10. In this present case, the packaging material sealing device 12 is mounted to the machine frame 64 so that at least one element or unit of the packaging material sealing device 12 can be moveable along a vertical axis 110 (cf. FIGS. 1 and 2). The packaging material sealing device 12 comprises a carrier element 70. All components of the packaging material sealing device 12 are connected directly or indirectly with the carrier element 70. The carrier element 70 is intended for connection with the machine frame 64. The carrier element 70 can be mounted movably, preferably movably along the vertical axis 110 and/or rotatably, on the machine frame 64. In this case, the carrier element 70 is mounted to the machine frame 64 in a non-rotatable fixation. However, in this present case, the carrier element 70 is mounted movably along the vertical axis 110.

The packaging material sealing device 12 comprises a first sealing jaw 16 and at least a second sealing jaw 18. For actuating the two sealing jaws 16, 18 along a sealing direction 30 the packaging material sealing device 12 has at least one movement unit 20, which comprises a first actuator 26 and at least a second actuator 28. The two actuators 26, 28 can comprise for example a stepper motor, a pneumatic motor or a hydraulic motor. In this present embodiment the two actuators 26, 28 each comprise a servo motor.

Figure 8:
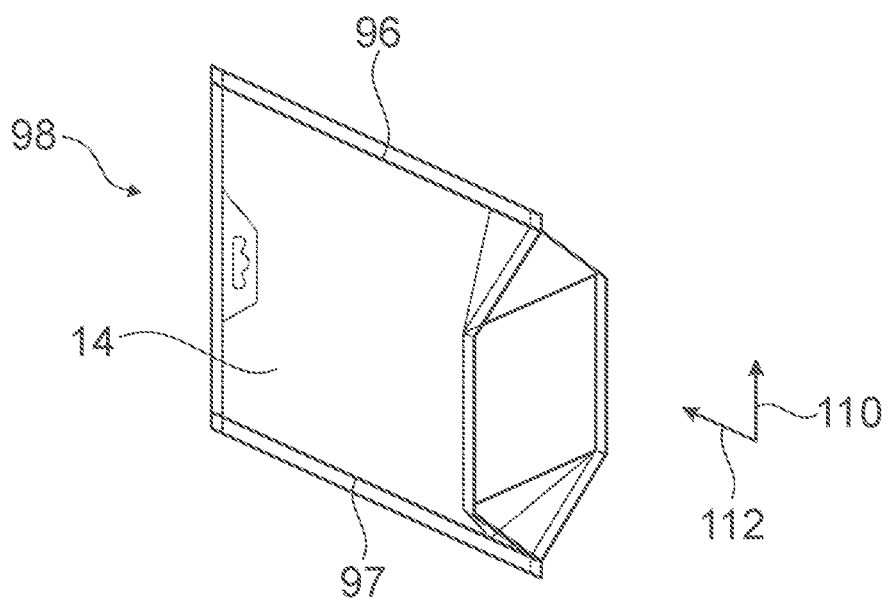

The movement unit 20 is configured to convert a power, which is generatable by the two actuators 26, 28 and acts onto the two sealing jaws 16, 18, into a movement of the two sealing jaws 16, 18 relative to each other. By actuating the two actuators 26, 28, the two sealing jaws 16, 18 are movable along the sealing direction 30, namely towards each other. The two actuators 26, 28 are intended in at least one operating state for moving the two sealing jaws 16, 18 along a horizontal axis 112 relative to each other. The two sealing jaws 16, 18 are configured to seal the packaging material 14, 14', which is arrangeable between the at least two sealing jaws 16, 18. In a sealing position, the packaging material 14, 14' is placed between the two sealing jaws 16, 18. During a sealing process the two sealing jaws 16, 18 are in contact with the packaging material 14, 14' in order to create at least one sealing seam 96, 96', 97, 97' in the packaging material 14, 14'. In this present case, the sealing seam 96, 97 of the packaging material 14 is produced substantially perpendicular to the sealing direction 30. The sealing seam 96, 97 of the packaging material 14 is substantially parallel to the horizontal axis 112. FIG. 8 exemplarily shows a sealed package 98 formed of the packaging material 14 having two sealing seams 96, 97. Further, FIG. 10 exemplarily shows a package 98' formed of the packaging material 14' having at least two sealing seams 96', 97'. The package 98 differs from the package 98' by at least an orientation of the sealing seams 96, 96', 97, 97'. The sealing seams 96', 97' of the packaging material 14' of the package 98' are oblique relative to the horizontal axis 112. For sealing such sealing seams 96', 97' the two sealing jaws 16, 18 have to be rotate. The rotation of the two sealing jaws 16, 18 is describe later.

For controlling the two actuators 26, 28 the packaging material sealing device 12 comprises a control unit 32. The control unit 32 controls the two actuators 26, 28 for moving the two sealing jaws 16, 18 and setting a sealing force for the two sealing jaws 16, 18. In at least one operating state the control unit 32 can simultaneously control both actuators 26, 28.

Figure 9:
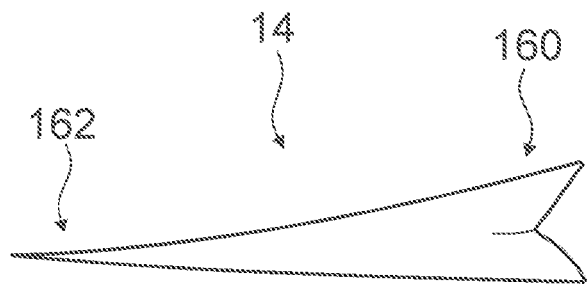

FIG. 9 shows a cross section of the packaging material 14, namely the packaging material tube bevor a sealing. In this present case, the packaging material 14 has in a first section 160 four layers and in a second section 162 two layers. For providing a homogeneously sealed packaging material with different numbers of layers in different sections of the packaging material 14, the two sealing jaws 16, 18 have to seal with an asymmetrical sealing force. In this present case the control unit 32 controls the two actuators 26, 28 for setting the asymmetrical sealing force for the two sealing jaws 16, 18. When the torque or an end position of the two actuators 26, 28, in particular the two servo motors, is different during at least the sealing process, the resulting sealing force is asymmetric.

Figure 3:
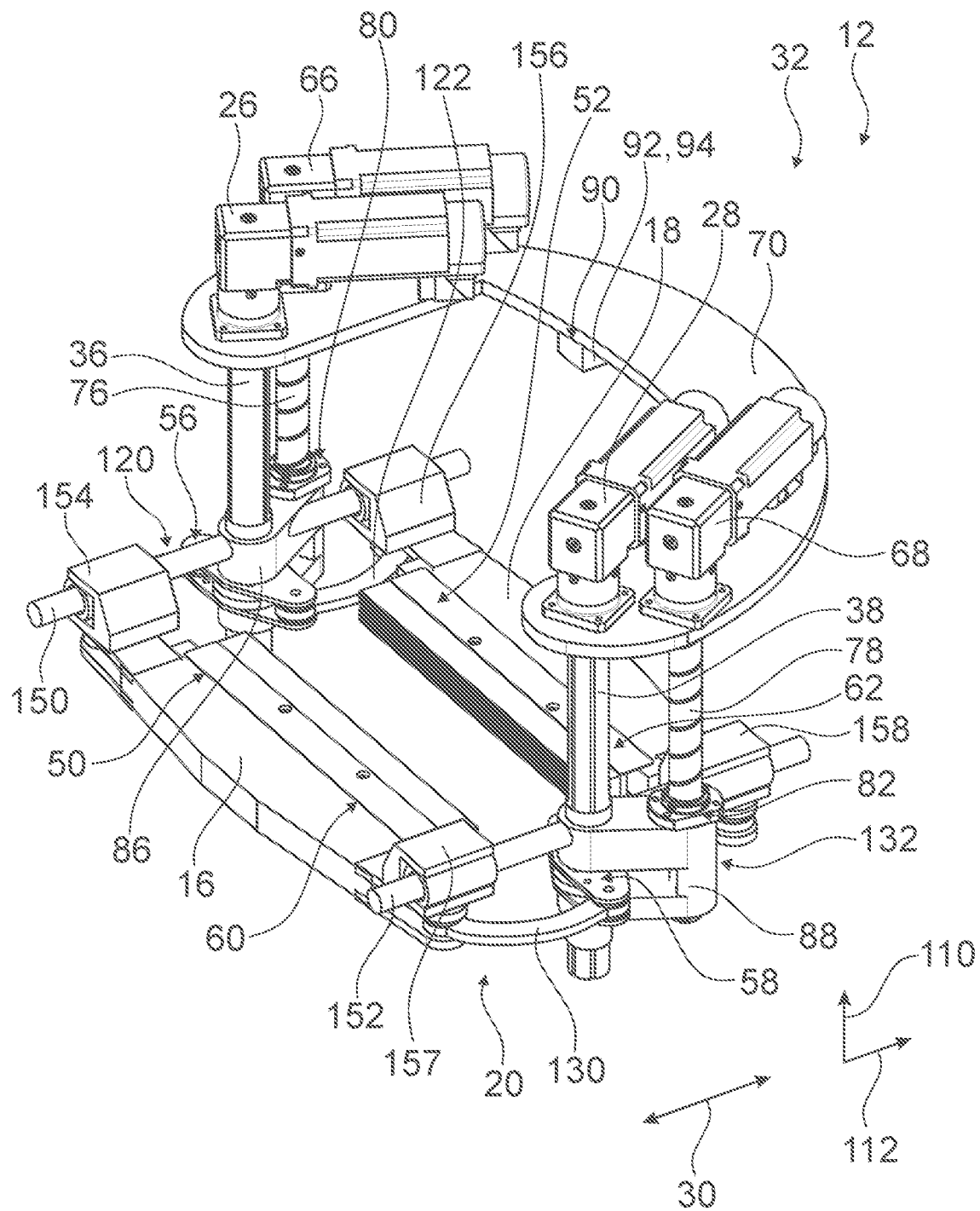
Figure 4:
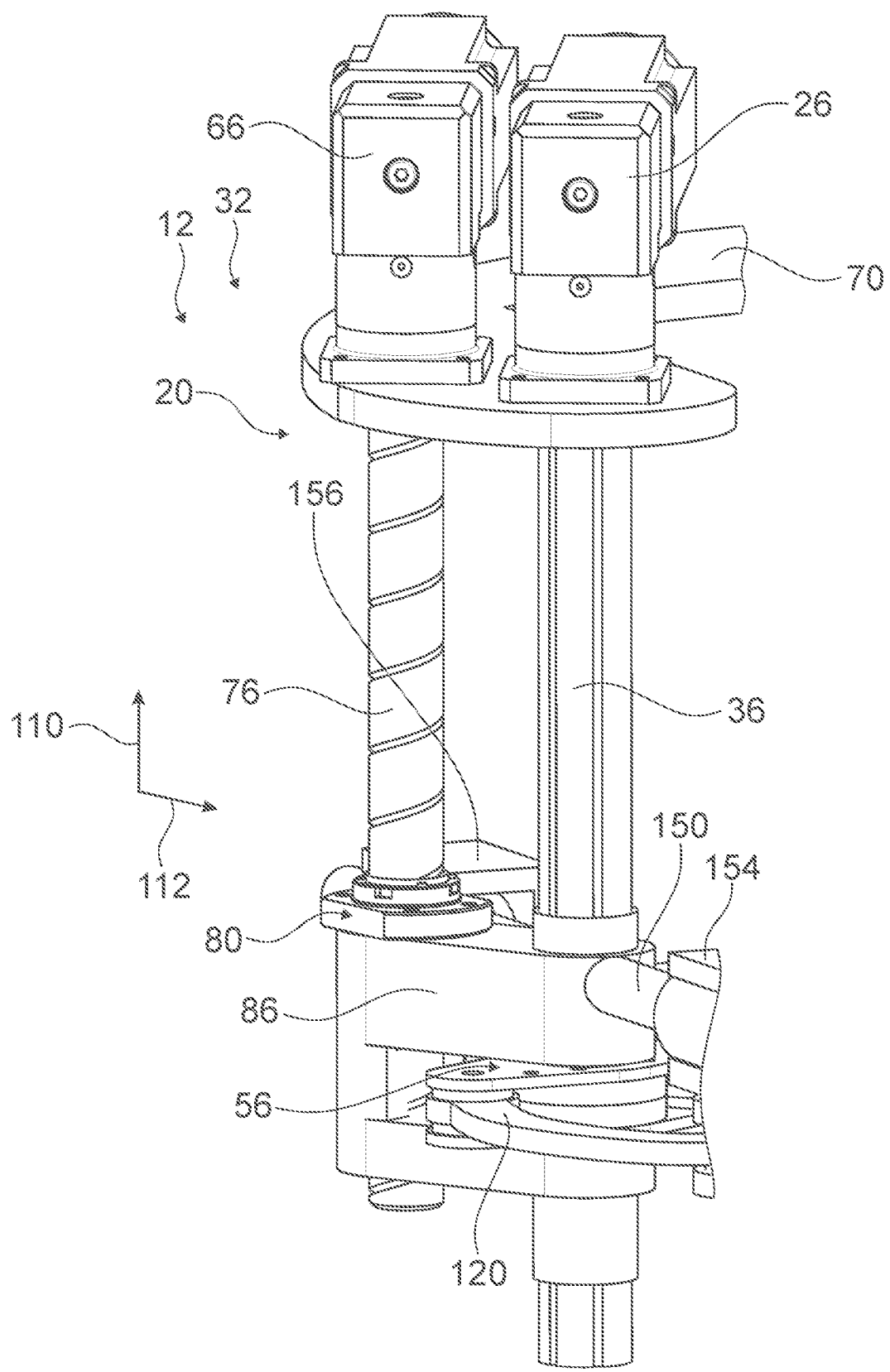
Figure 5:
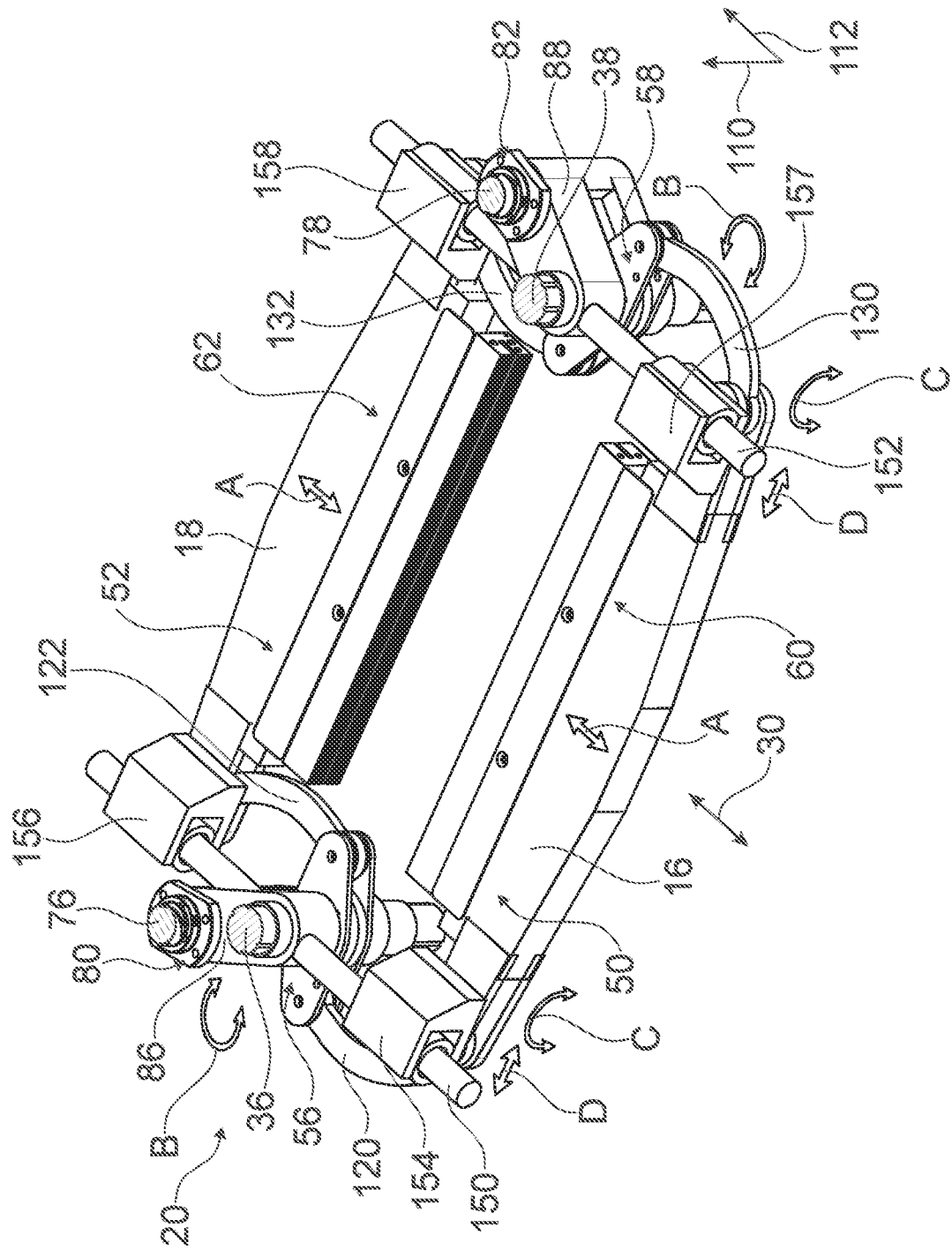
Figure 6:
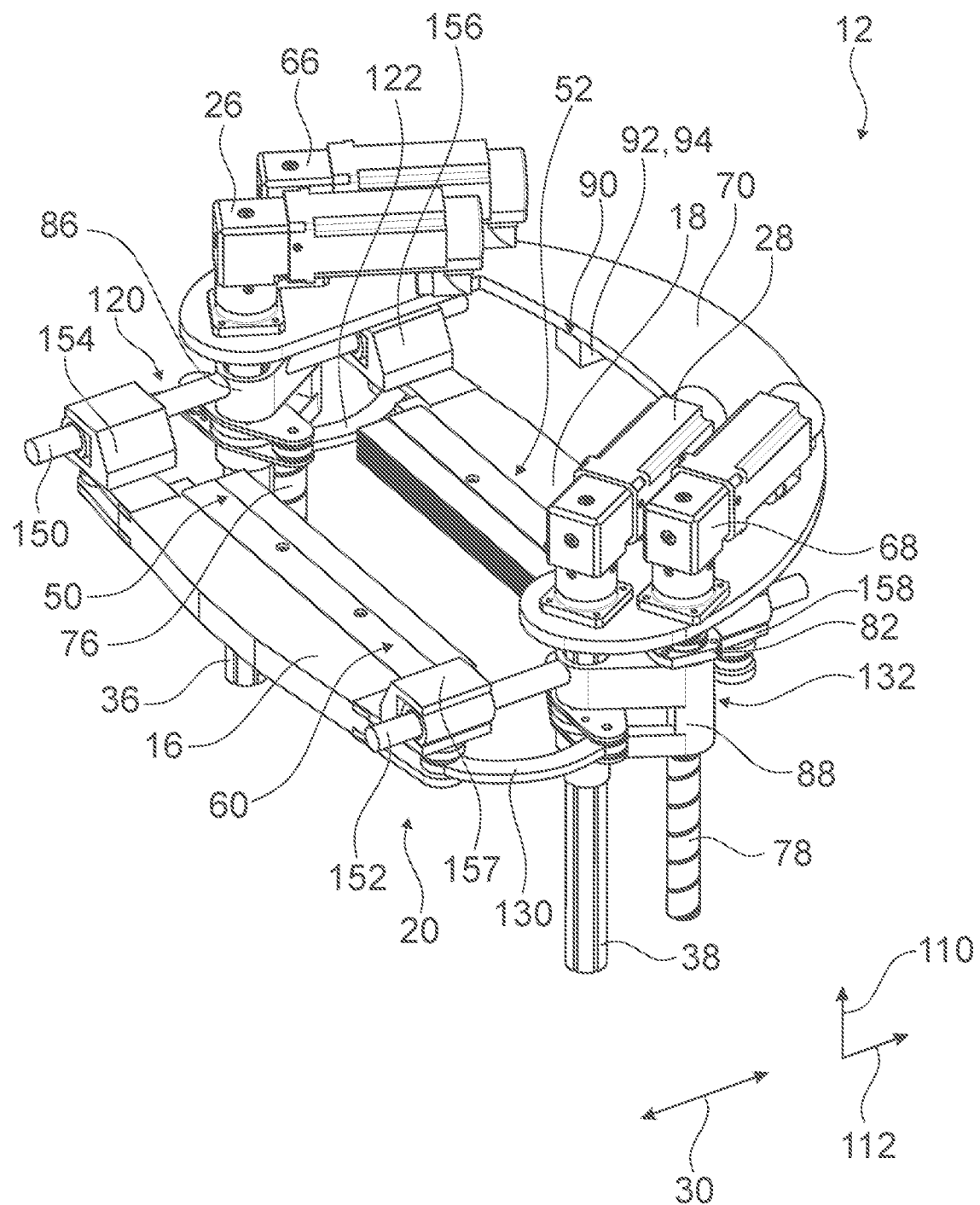

For transferring the torque from the first actuator 26 to the two sealing jaws 16, 18, the movement unit 20 comprises a first drive shaft 36, which is connected to the first actuator 26 and allows movement of first sections 50, 52 of the two sealing jaws 16, 18. Further the movement unit 20 comprises a second drive shaft 38, which is connected to the second actuator 28 and allows movement of second sections 60, 62 of the two sealing jaws 16, 18. Each of the two sealing jaws 16, 18 has one of the first sections 50, 52 and at least one of the second sections 60, 62. The first sealing jaw 16 has the first section 50 and the second section 60. The second sealing jaw 18 has the first section 52 and the second section 62. In this present case, the term "section" is also be understood as "area". Here, the first sections 50, 52 refer to left sides of the two sealing jaws 16, 18 and the second sections 60, 62 refer to right sides of the said two sealing jaws 16, 18 (c.f. FIGS. 3, 5 and 6).

During the sealing process, the actuators 26, 28 have different torques thereby the two drive shafts 36, 38 are rotated in different ways, in particular with different velocities and/or by different distances and/or turns. Depending on a setting of the control unit 32, for example the first actuator 26 can set a stronger sealing force for the first sections 50, 52 compared to the second sections 60, 62. Alternatively the second actuator 28 can set a stronger sealing force for the second sections 60, 62 compared to the first sections 50, 52. In that way it can be set an asymmetrical sealing force to the two sealing jaws 16, 18.

Due to the two drive shafts 36, 38 the torque of the two actuators 26, 28 is transferable to the two sealing jaws 16, 18. In this present case, the first drive shaft 36 is connected with the first actuator 26, in particular with the first servo motor of the first actuator 26, in this present case, via at least one gearbox. The second drive shaft 38 is also connected with the second actuator 28, in particular with the second servo motor of the second actuator 28, in this present case, via at least one gearbox.

FIGS. 1 to 3 show that the first drive shaft 36 and the second drive shaft 38 are each mounted perpendicularly to the sealing direction 30. In this present case, the first drive shaft 36 and the second drive shaft 38 are mounted substantially parallel to each other. Whereas FIGS. 1 and 2 show at least the section of the packaging machine 10 and present an arrangement of the packaging material sealing device 12, FIGS. 3 to 6 show close-up views of the packaging material sealing device 12. The design and construction of the packaging material sealing device 12 is described in detail below.

For connecting the two drive shafts 36, 38 with the two sealing jaws 16, 18 the movement unit 20 comprises a first movement element 86 and at least one second movement element 88. Further, the packaging material sealing device 12 comprises a first articulated joint 56 for transferring the torque of the first drive shaft 36 to the first sections 50, 52 of the two sealing jaws 16, 18. The first movement element 86 supports the first articulated joint 56. The first movement element 86 is connected with the first articulated joint 56. The packaging material sealing device 12 comprises a second articulated joint 58 for transferring the torque of the second drive shaft 38 to the second sections 60, 62 of the two sealing jaws 16, 18. The first movement element 86 supports the first articulated joint 56. The first movement element 86 is connected with the first articulated joint 56. It can be conceivable that the first movement element 86 is made in a one-piece embodiment with the first articulated joint 56 and/or the second movement element 88 can be made in a one-piece embodiment with the second articulated joint 58. Alternatively, it is also conceivable that the first articulated joint 56 is mounted in a detachable, namely a non-destructive, manner on the first movement element 86 and/or the second articulated joint 58 is mounted in a detachable, namely a non-destructive, manner on the second movement element 88. In this present embodiment the first articulated joint 56 is movably, namely rotatably, mounted in the first movement element 86 and/or the second articulated joint 58 is movably, namely rotatably, mounted in the second movement element 88 (cf. FIG. 3). In this present embodiment, the torque of the two actuators 26, 28 is converted to the sealing force using two double crank-slider mechanisms. The two articulated joints 56, 58 are each embodied as a crank-slider unit.

The first articulated joint 56 comprises at least two hinging arms 120, 122, wherein a first hinging arm 120 of the two hinging arms 120, 122 is connected with the first section 50 of the first sealing jaw 16. A second hinging arm 122 of the two hinging arms 120, 122 is connected with the first section 52 of the second sealing jaw 18. Due to the rotation of the first drive shaft 36 the two hinging arms 120, 122 are movable to move the first sections 50, 52 of the two sealing jaws 16, 18 along the sealing direction 30. Further, the second articulated joint 58 comprises at least two further hinging arms 130, 132, wherein a further first hinging arm 130 of the two further hinging arms 130, 132 is connected with the second section 60 of the first sealing jaw 16. A further second hinging arm 132 of the two further hinging arms 130, 132 is connected with the second section 62 of the second sealing jaw 18. Due to the rotation of the second drive shaft 38 the two further hinging arms 130, 132 are movable to move the second sections 60, 62 of the two sealing jaws 16, 18 along the sealing direction 30.

It is conceivable that in at least one operating state the movement unit 20 compresses the two sealing jaws 16, 18 by pushing the two sealing jaws 16, 18 toward each other. In this present case, the movement unit 20 compresses the two sealing jaws 16, 18 by pulling the two sealing jaws 16, 18 toward each other. During the sealing process the two sealing jaws 16, 18 are compressed towards each other by rotating the two drive shafts 36, 38, thereby the hinging arms 120, 122 and/or the further hinging arms 130, 132 are moved for pulling the two sealing jaws 16, 18 along the sealing direction 30. By turning the two drive shafts 36, 38 in an opposite direction, the two sealings jaws 16, 18 can again be pulled away from each other against the sealing direction 30. During the sealing process, the package 98 to be sealed, which is formed from the packaging material 14, 14', is separated, namely cut off, from the packaging material tube. After the sealing process the two sealing jaws 16, 18 are again pulled apart from each other against the sealing direction 30 for releasing the sealed packaging material 14, 14', namely the sealed package 98.

For moving the two sealing jaws 16, 18 perpendicular to the sealing direction 30, the movement unit 20 comprises a further first actuator 66 and at least a further second actuator 68. The two further actuators 66, 68 can be embodied in a different way as the two actuators 26, 28 mentioned-above. In this present embodiment, the two further actuators 66, 68 are identically embodied as the two actuators 26, 28. The two further actuators 66, 68 are intended to move the two sealing jaws 16, 18 along the vertical axis 110. During the sealing process, namely during sealing of the packaging material 14, 14' the two sealing jaws 16, 18 are movable along the vertical axis 110.

The movement unit 20 comprises a first threaded rod 76 connected to the further first actuator 66 and comprises at least a second threaded rod 78 connected to the further second actuator 68, wherein the two sealing jaws 16, 18 are movable perpendicular to the sealing direction 30 along the two threaded rods 76, 78. The first threaded rod 76 and the second threaded rod 78 are each mounted perpendicularly to the sealing direction 30. According to FIGS. 3 to 6 the threaded rods 76, 78 are mounted parallelly to the two drive shafts 36, 38. The first threaded rod 76 is connected with the further first actuator 66, namely with at least one further first servo motor of the further first actuator 66, via at least one gearbox. The second threaded rod 78 is also connected with the further second actuator 68, namely with at least one further second servo motor of the further second actuator 68, via at least one gearbox.

The two actuators 26, 28 are intended to move the two sealing jaws 16, 18 along the sealing direction 30, which is substantially parallel to the horizontal axis 112, whereas the two further actuators 66, 68 are intended to move the two sealing jaws 16, 18 along the vertical axis 110, which is substantially perpendicular to the sealing direction 30. In at least one operating state the control unit 32 actuates the two further actuators 66, 68, whereby the two sealing jaws 16, 18 are movable along the two drive shafts 36, 38.

In the present case, at least during the sealing process, namely while the two sealing jaws 16, 18 seal the packaging material 14, 14' the control unit 32 actuates the two further actuators 66, 68, whereby the two sealing jaws 16, 18 are movable along the two drive shafts 26, 28 and simultaneously along the two threaded rods 76, 78. Alternatively and/or additionally the control unit 32 actuates the two further actuators 66, 68 after the sealing process.

During the sealing process, namely during sealing of the packaging material 14, 14' the two sealing jaws 16, 18 are moved along the vertical axis 110 from a first rest position to a second rest position. FIG. 6 shows the first rest position of the two sealing jaws 16, 18, wherein FIGS. 1 to 5 show the second rest position of the two sealing jaws 16, 18. At a beginning of the sealing process the two sealing jaws 16, 18 are positioned in the first rest position close to the two actuators 26, 28 and/or the two further actuators 66, 68 (cf. FIG. 6). In the first rest position the two sealing jaws 16, 18 are arranged close to the filling station 54, namely the filling tube 55 for taking and/or receiving the packaging material 14, 14'. Along a transport direction 72 of the packing material 14, 14' the two sealing jaws 16, 18 receive the packaging material 14, 14'. The transport direction 72 of the packaging material 14, 14' is substantially parallel to the vertical axis 110 (cf. FIGS. 1 and 2). In the first rest position the control unit 32 actuates at least the two actuators 26, 28 for moving the two sealing jaws 16, 18 towards each other along the sealing direction 30, namely for compressing the packaging material 14, 14' between the two sealing jaws 16, 18.

During the sealing process, namely during sealing of the packaging material 14, 14' the two sealing jaws 16, 18 are moved along the vertical axis 110 from the first rest position to the second rest position, thereby transporting and/or moving the packaging material 14, 14' along the transport direction 72. In the second rest position the control unit 32 actuates at least the two actuators 26, 28 to move the two sealing jaws 16, 18 apart from each other against the sealing direction 30 for releasing the sealed packaging material 14, 14', namely the sealed package 98, 98'.

In this present case, the two drive shafts 36, 38, namely the first drive shaft 36 and at least the second drive shaft 38 are embodied as spline shafts. The two drive shafts 36, 38 each comprise guiding rails, in which the movement elements 86, 88 are moveable perpendicularly to the sealing direction. For the purpose of improving a configuration/construction of the packaging material sealing device 12 and/or of improving a connection of the two sealing jaws 16, 18 to the two actuators 26, 28 and/or the two further actuators 66, 68 and/or of improving a transmission of a torque of the two actuators 26, 28 to the sealing jaws 16, 18, FIGS. 3 to 6 show that the first movement element 86 has a first threaded portion 80 cooperating with the first threaded rod 76 and which is supported on the first drive shaft 36. Further, the second movement element 88 has a second threaded portion 82 cooperating with the second threaded rod 78 and which is supported on the second drive shaft 38. The two movement elements 86, 88 are intended for connecting the two sealing jaws 16, 18, namely the two articulated joints 56, 58 with the two drive shafts 36, 38 and the two threaded rods 66, 68.

Figure 10:
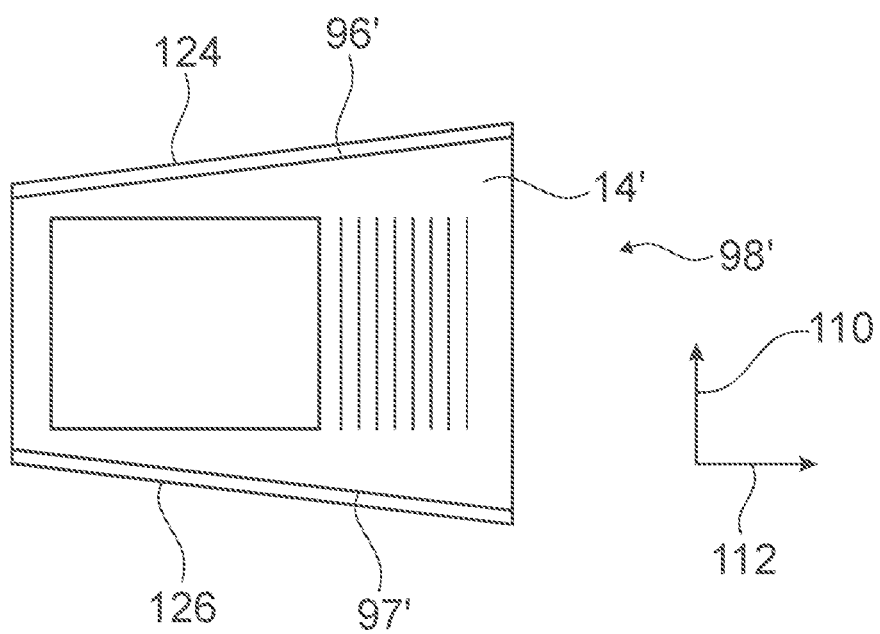

According to FIG. 10, which shows the sealed package 98' having the two sealing seams 96', 97' it should be pointed out once again, that the two sealing seams 96', 97' are slanted and differ from horizontal sealing seams, since the package 98' has slanted sides 124, 126. For sealing such packages 98'. in at least one operating state the control unit 32 controls a rotation of the two sealing jaws 16, 18 relative, namely perpendicular, to the transport direction 72 of the packaging material 14, 14'. The control unit 32 controls the rotation depending on a configuration, for example a shape, a structure, a size and/or a form, of the packaging material 14, 14' to be sealed. In the operating state the control unit 32 controls the rotation of the two sealing jaws 16, 18 by actuating the further first actuator 66 independently from the further second actuator 68. For example, the control unit 32 can control the rotation by only actuating the further first actuator 66, namely without actuating the further second actuator 68. Thereby the first sections 50, 52 of the sealing jaws 16, 18 are movable along the first threaded rod 76. It is also conceivable that the control unit 32 only actuates the further second actuator 68, namely without actuating the further first actuator 66. Thereby the second sections 60, 62 of the sealing jaws 16, 18 are movable along the second threaded rod 78. Alternatively, the control unit 32 can control the rotation by actuating the two further actuators 66, 68 in opposite directions so that, for example, the first sections 50, 52 of the sealing jaws 16, 18 move upwardly along the first threaded rod 76 and the second sections 60, 62 of the sealing jaws 16, 18 move downwardly along the second threaded rod 78.

FIG. 5 shows a detailed view of the movement unit 20 and the two sealing jaws 16, 18, wherein the two threaded rods 76, 78 and the two drive shafts 36, 38 are dispensed with for better visibility. The movement unit 20 comprises at least two guiding rails 150, 152 for moving the two sealing jaws 16, 18 along and/or against the sealing direction 30. The control unit 32 controls the two actuators 26, 28 for moving the two sealing jaws 16, 18 along the two guiding rails 150, 152. The two guiding rails 150, 152 each have clearance with respect to their bearings 154, 156, 157, 158 in order to allow the rotation of the two sealing jaws 16, 18 relative to the transport direction 72. The bearings 154, 156, 157, 158 are part of the movement unit 20. In this present case, each guiding rail 150, 152 is mounted into at least two bearings 154, 156, 157, 158. The movement unit 20 comprises a first bearing 154 and at least a further first bearing 156 of the bearings 154, 156, 157, 158. The first bearing 154 and the further first bearing 156 each receive the first guiding rail 150. Further, the movement unit 20 comprises a second bearing 157 and at least a further second bearing 158 of the bearings 154, 156, 157, 158. The second bearing 157 and the further second bearing 158 each receive the second guiding rail 152.

The two movement elements 86, 88 are connected with the two guiding rails 150, 152, wherein the first movement element 86 is connected with the first guiding rail 150 and the second movement element 88 is connected with the second guiding rail 152. The two movement elements 86, 88 receive the two guiding rails 150, 152. In this present case, the first hinging arm 120 is connected with the first bearing 154 and the second hinging arm 122 is connected with the further first bearing 156. Further, the further first hinging arm 130 is connected with the second bearing 157 and the further second hinging arm 132 is connected with the further second bearing 158. In FIG. 5, the arrows show the possible different directions of movement of the movement unit 20 and/or the sealing jaws 16, 18 along the vertical axis 110 and/or the horizontal axis 112. The two sealing jaws 16, 18 are movable in and against the sealing direction 30, namely along the horizontal axis 112 for opening and closing (c.f. arrows A). Further, the two sealing jaws 16, 18 are rotatable around the vertical axis 110 (c.f. arrows B). Moreover, the two sealing jaws 16, 18 are rotatable around the horizontal axis 112 (c.f. arrows C). Furthermore, the two sealing jaws 16, 18 are movable along the arrows D in a horizontal plane.

The packaging material sealing device 12 comprises a sensor unit 90 for detecting a parameter of the packaging material 14, 14'. The sensor unit 90 communicates with the control unit 32. The sensor unit 90 is connected with the control unit 32 for sending and/or transmitting the parameter to the control unit 32.

The sensor unit 90 comprises at least one sensor 92 for detecting a number of layers of the packaging material 14, 14' to be sealed. The sensor 92 for detecting the number of layers of the packaging material 14, 14' can be mounted for example on the carrier element 70 and/or on the movement unit 20, especially on at least one of the movement elements 86, 88. In this present case, the sensor 92 is exemplary mounted on the carrier element 70. Depending on the detection of the number of layers of the packaging material 14, 14' the control unit 32 automatically controls the setting of the sealing force for the two sealing jaws 16, 18. In this present case, the sensor unit 90 comprises at least one sensor 94 for detecting a shape of the packaging material 14, 14'. The sensor 94 is made in one piece with the sensor 92. Depending on the detection of the shape of the packaging material 14, 14' the control unit 32 can automatically control the rotation, namely at least one rotation angle of the two sealing jaws 16, 18. In this present case, the control unit 32 is intended to store at least one setting for the two actuators 26, 28 and/or the further actuators 66, 68 in a recipe belonging to a certain sealing process. The recipe comprises stored settings to a production, namely at least one sealing process of a certain product. In that way, different setting values for a packaging material sealing device can be stored and used for every possible product that is to be produced, namely at least sealed.

Figure 7:
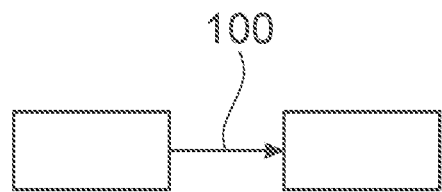

Further FIG. 7 shows schematically a flow chart of a method for operating the packaging material sealing device 12. The method can comprise many process steps but is exemplarily described by means of only one process step 100. The process step 100 describes the sealing process for sealing the packaging material 14, 14'. In the process step 100 the two sealing jaws 16, 18 are moved as described above.

What is claimed is:

1. A packaging material sealing device (12) comprising:
   a first sealing jaw (16) and at least a second sealing jaw (18);
   at least one movement unit (20), which comprises a first actuator (26) and at least a second actuator (28) for actuating the two sealing jaws (16, 18) along a sealing direction (30); and
   at least one control unit (32),
   wherein in at least one operating state the at least one control unit (32) controls the two actuators (26, 28) for setting an asymmetrical sealing force for the two sealing jaws (16, 18),
   wherein the at least one movement unit (20) comprises a first drive shaft (36), which is connected to the first actuator (26) and allows movement of first sections (50, 52) of the two sealing jaws (16, 18), and at least a second drive shaft (38), which is connected to the second actuator (28) and allows movement of second sections (60, 62) of the two sealing jaws (16, 18).

2. The packaging material sealing device (12) according to claim 1, wherein the first drive shaft (36) and the second drive shaft (38) are each mounted perpendicularly to the sealing direction (30).

3. The packaging material sealing device (12) according to claim 1, wherein the at least one movement unit (20) comprises a first articulated joint (56) for transferring a torque of the first drive shaft (36) to the first sections (50, 52) of the two sealing jaws (16, 18) and comprises a second articulated joint (58) for transferring a torque of the second drive shaft (38) to the second sections (60, 62) of the two sealing jaws (16, 18).

4. The packaging material sealing device (12) according to claim 1, wherein in at least one operating state the at least one movement unit (20) compresses the two sealing jaws (16, 18) by pulling the two sealing jaws (16, 18) toward each other.

5. The packaging material sealing device (12) according to claim 1, wherein the at least one movement unit (20) comprises a further first actuator (66) and at least a further second actuator (68) for moving the two sealing jaws (16, 18) perpendicular to the sealing direction (30).

6. The packaging material sealing device (12) according to claim 5, wherein the at least one movement unit (20) comprises a first threaded rod (76) connected to the further first actuator (66) and comprises at least a second threaded rod (78) connected to the further second actuator (68), wherein the two sealing jaws (16, 18) are movable perpendicular to the sealing direction (30) along the two threaded rods (76, 78).

7. The packaging material sealing device (12) according to claim 6, wherein the two threaded rods (76, 78) are mounted parallelly to the two drive shafts (36, 38).

8. The packaging material sealing device (12) according to claim 6, wherein in at least one operating state the at least one control unit (32) actuates the two further actuators (66, 68) whereby the two sealing jaws (16, 18) are movable along the two threaded rods (76, 78).

9. The packaging material sealing device (12) according to claim 1, wherein the at least one movement unit (20) comprises at least one first movement element (86), which has a first threaded portion (80) cooperating with a first threaded rod (76) and which is supported on the first drive shaft (36), and comprises at least one second movement element (88), which has a second threaded portion (82) cooperating with a second threaded rod (78) and which is supported on the second drive shaft (38).

10. The packaging material sealing device (12) according to claim 1, wherein the at least one movement unit (20) comprises a first articulated joint (56) for transferring a torque of the first drive shaft (36) to the first sections (50, 52) of the two sealing jaws (16, 18) and comprises a second articulated joint (58) for transferring a torque of the second drive shaft (38) to the second sections (60, 62) of the two sealing jaws (16, 18), wherein the at least one movement unit (20) comprises at least one first movement element (86), which has a first threaded portion (80) cooperating with a first threaded rod (76) and which is supported on the first drive shaft (36), and comprises at least one second movement element (88), which has a second threaded portion (82) cooperating with a second threaded rod (78) and which is supported on the second drive shaft (38), wherein the at least one first movement element (86) supports the first articulated joint (56) and the at least one second movement element (88) supports the second articulated joint (58).

11. The packaging material sealing device (12) according to claim 5, wherein in at least one operating state the at least one control unit (32) controls a rotation of the two sealing jaws (16, 18) relative to a transport direction (72) of a packaging material (14, 14').

12. The packaging material sealing device (12) according to claim 11, wherein in the at least one operating state the at least one control unit (32) controls the rotation of the two sealing jaws (16, 18) by actuating the further first actuator (66) independently from the further second actuator (68).

13. The packaging material sealing device (12) according to claim 11, wherein at least two guiding rails (150, 152) of the at least one movement unit (20) for moving the two sealing jaws (16, 18) along at least the sealing direction (30) each have clearance with respect to bearings (154, 156, 157, 158) of the at least two guiding rails (150, 152) in order to allow the rotation of the two sealing jaws (16, 18) relative to the transport direction (72).

14. The packaging material sealing device (12) according to claim 1, further comprising a sensor unit (90) for detecting a parameter of a packaging material (14, 14').

15. The packaging material sealing device (12) according to claim 14, wherein the sensor unit (90) comprises at least one sensor (92) for detecting a number of layers of the packaging material (14, 14') to be sealed.

16. The packaging material sealing device (12) according to claim 14, wherein the sensor unit (90) comprises at least one sensor (94) for detecting a shape of the packaging material (14, 14').

17. The packaging material sealing device (12) according to claim 1, wherein the at least one control unit (32) is configured to store at least one setting for at least the two actuators (26, 28) in a recipe belonging to a certain sealing process.

18. A packaging machine (10), comprising a packaging material sealing device (12) according to claim 1.

19. A method for operating a packaging material sealing device (12) according to claim 1, the method comprising the step of setting an asymmetrical sealing force for the two sealing jaws (16, 18) via the at least one control unit (32) by controlling the two actuators (26, 28).

20. A packaging material sealing device (12) comprising:
a first sealing jaw (16) and at least a second sealing jaw (18);
at least one movement unit (20), which comprises a first actuator (26) and at least a second actuator (28) for actuating the two sealing jaws (16, 18) along a sealing direction (30); and
at least one control unit (32),
wherein the at least one movement unit (20) comprises a first drive shaft (36), which is connected to the first actuator (26) and allows movement of first sections (50, 52) of the two sealing jaws (16, 18), and at least a second drive shaft (38), which is connected to the at least second actuator (28) and allows movement of second sections (60, 62) of the two sealing jaws (16, 18),
wherein the at least one movement unit (20) comprises a further first actuator (66) and at least a further second actuator (68) for moving the two sealing jaws (16, 18) perpendicular to the sealing direction (30),
wherein the at least one movement unit (20) comprises a first threaded rod (76) connected to the further first actuator (66) and comprises at least a second threaded rod (78) connected to the further second actuator (68), wherein the two threaded rods (76, 78) are mounted parallelly to the two drive shafts (36, 38.

21. A packaging material sealing device (12) comprising:
a first sealing jaw (16) and at least a second sealing jaw (18);
at least one movement unit (20), which comprises a first actuator (26) and at least a second actuator (28) for actuating the two sealing jaws (16, 18) along a sealing direction (30); and
at least one control unit (32),
wherein the at least one movement unit (20) comprises a first drive shaft (36), which is connected to the first actuator (26) and allows movement of first sections (50, 52) of the two sealing jaws (16, 18), and at least a second drive shaft (38), which is connected to the second actuator (28) and allows movement of second sections (60, 62) of the two sealing jaws (16, 18), wherein the at least one movement unit (20) comprises a further first actuator (66) and at least a further second actuator (68) for moving the two sealing jaws (16, 18) perpendicular to the sealing direction (30), wherein the at least one movement unit (20) comprises a first threaded rod (76) connected to the further first actuator (66) and comprises at least a second threaded rod (78) connected to the further second actuator (68), wherein the two sealing jaws (16, 18) are movable perpendicular to the sealing direction (30) along the two threaded rods (76, 78), wherein the two threaded rods (76, 78) are mounted parallelly to the two drive shafts (36, 38).

22. A packaging material sealing device (12) comprising:
a first sealing jaw (16) and at least a second sealing jaw (18);
at least one movement unit (20), which comprises a first actuator (26) and at least a second actuator (28) for actuating the two sealing jaws (16, 18) along a sealing direction (30); and
at least one control unit (32),
wherein in at least one operating state the at least one control unit (32) controls the two actuators (26, 28) for setting an asymmetrical sealing force for the two sealing jaws (16, 18),
wherein in at least one operating state the at least one control unit (32) controls a rotation of the two sealing jaws (16, 18) relative to a transport direction (72) of a packaging material (14, 14').

\* \* \* \* \*